US010102630B2

(12) United States Patent
Smolic et al.

(10) Patent No.: US 10,102,630 B2
(45) Date of Patent: Oct. 16, 2018

(54) VIDEO OBJECT TAGGING USING SEGMENTATION HIERARCHY

(71) Applicant: Disney Enterprises, Inc., Burbank, CA (US)

(72) Inventors: Aljoscha Smolic, Aaru (CH); Jordi Pont-Tuset, Barcelona (ES); Miquel Angel Farre Guiu, Bern (CH)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/692,523

(22) Filed: Apr. 21, 2015

(65) Prior Publication Data

US 2016/0313894 A1    Oct. 27, 2016

(51) Int. Cl.
| | |
|---|---|
| *G06T 7/215* | (2017.01) |
| *G06T 7/12* | (2017.01) |
| *G06F 17/30* | (2006.01) |
| *G11B 27/00* | (2006.01) |
| *G06T 7/00* | (2017.01) |

(52) U.S. Cl.
CPC ........ *G06T 7/0081* (2013.01); *G06F 17/3082* (2013.01); *G06T 7/12* (2017.01); *G06T 7/215* (2017.01); *G11B 27/00* (2013.01); *G06T 2207/10016* (2013.01); *G06T 2207/20016* (2013.01)

(58) Field of Classification Search
None
See application file for complete search history.

(56) References Cited

U.S. PATENT DOCUMENTS

| | | | | |
|---|---|---|---|---|
| 2012/0242700 | A1* | 9/2012 | Osuga | G09G 5/00 345/638 |
| 2014/0321750 | A1* | 10/2014 | Nouri | G06K 9/00335 382/187 |
| 2015/0138192 | A1* | 5/2015 | Marchenko | G06T 19/20 345/419 |
| 2015/0373281 | A1* | 12/2015 | White | G06F 3/0482 348/660 |

(Continued)

OTHER PUBLICATIONS

Philippe Salembier, "Binary Partition Tree as an Efficient Representation for Image Processing, Segmentation, and Information Retrieval", vol. 9, No. 4, Apr. 2000, pp. 561-576.

(Continued)

*Primary Examiner* — Yi Wang
(74) *Attorney, Agent, or Firm* — Farjami & Farjami LLP

(57) ABSTRACT

A system is provided for tagging an object in a video having a plurality of frames. The system includes a memory storing a segmentation hierarchy of a first frame of the plurality of frames and having a plurality of elements, a display, and a processor configured to display the first frame including the plurality of elements on the display, receive a first input selecting a first element of the plurality of elements displayed on the display, select a first region of the first frame based on the first input, display the first region of the first frame on the display, receive a second input from the user altering the first region of the first frame displayed on the display, and alter the first region by selecting a second region of the first frame based on the second input from the user and the segmentation hierarchy.

14 Claims, 6 Drawing Sheets

(56) References Cited

U.S. PATENT DOCUMENTS

2016/0132233 A1* 5/2016 Ghassabian .......... G06F 3/0237 715/773

OTHER PUBLICATIONS

Fabio Galasso, "Video Segmentation with Superpixels", Aug. 1, 2014, pp. 1-14.
Pablo Arbelaez, "Multiscale Combinatorial Grouping", University of Berkley, CVPR 2014, pp. 1-8.
Tsung-Yi Lin, "Michrosoft COCO: Common Objects in Context", May 1, 2014, pp. 1-16.
Yi Wu, "Online Object Tracking: A Benchmark", University of California at Merced, CVPR 2013, pp. 1-8.
Piotr Dollar, "Structured Forests for Fast Edge Detection", Microsoft Research, Computer Vision (ICCV), 2013, pp. 1-8.
Chenliang Xu, Flattening Supervoxel Hierarchies by the Uniform Entropy Slice, ICCV 2013, pp. 1-8.
Yann LeCun, "Gradient-Based Learning Applied to Document Recognition", Nov. 1998, pp. 1-46.
Laurent Najman, "Geodesic Saliency of Watershed Contours and Hierarchical Segmentation", Oct. 21, 2012, pp. 1163-1173.
David Varas, "Region-based particle filter for video object segmentation", CVPR 2014, pp. 1-8.
Fabio Galasso, "A Unified Vidoe Segmentation Benchmark: Annotation, Metrics and Analysis", Apr. 9, 2014, pp. 1-8.
Dan Banica, "Video Object Segmentation by Salient Segment Chain Composition", ICCVW 2013, pp. 1-8.
Pable Arbelaez, "Contour Detection and Hierarchical Image Sementation", Aug. 26, 2010, pp. 1-20.
Xavier Giro-I-Nieto, "GAT: a Graphical Annotation Tool for semantic region", Oct. 27, 2009, pp. 155-174.
Camille Couprie, "Causal Graph-Based Video Segmentation", 2013, pp. 1-5.
Pilippe Weinzaepfel, "DeepFlow: Large displacement optical flow with deep matching", ICCV 2013, pp. 1-8.
Jia Deng, "ImageNet: A Large-Scale Hierarchical Image Database", CVPR 2009, pp. 1-8.
Laura Leal-Taix'e, "Learning an image-based motion context for multiple people tracking", CVPR 2014, pp. 1-8.
Guillem Palou, "Hierarchical Video Representation with Trajectory Binary Partition Tree", CVPR 2013, pp. 1-8.
Patrik Sundberg, "Occlusion Boundary Detection and Figure/Ground Assignment from Optical Flow", CVPR 2011, pp. 1-8.
Dong Zhang, "Video Object Segmentation through Spatially Accurate and Temporally Dense Extraction of Primary Object Regions", CVPR 2013, pp. 1-8.
Ziaofeng Ren, "Discriminatively Trained Sparse Code Gradients for Contour Detection", NIPS 2012, pp. 1-9.

* cited by examiner

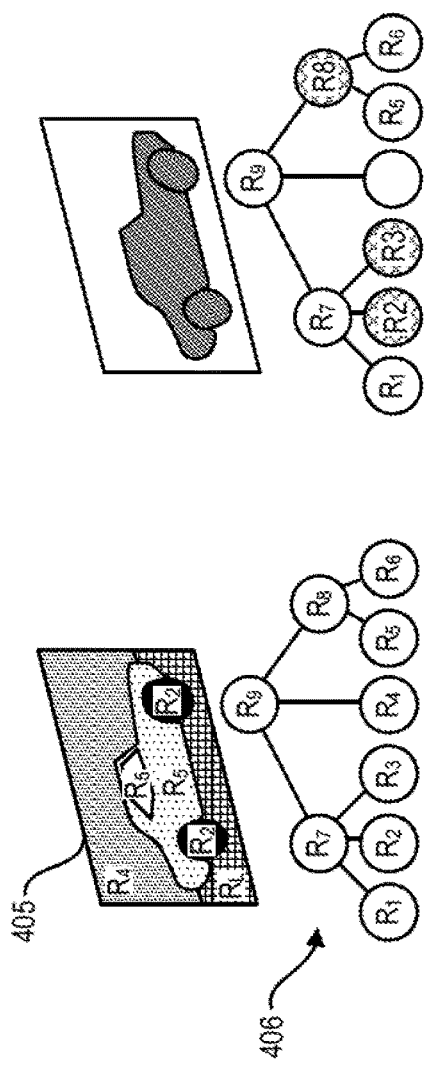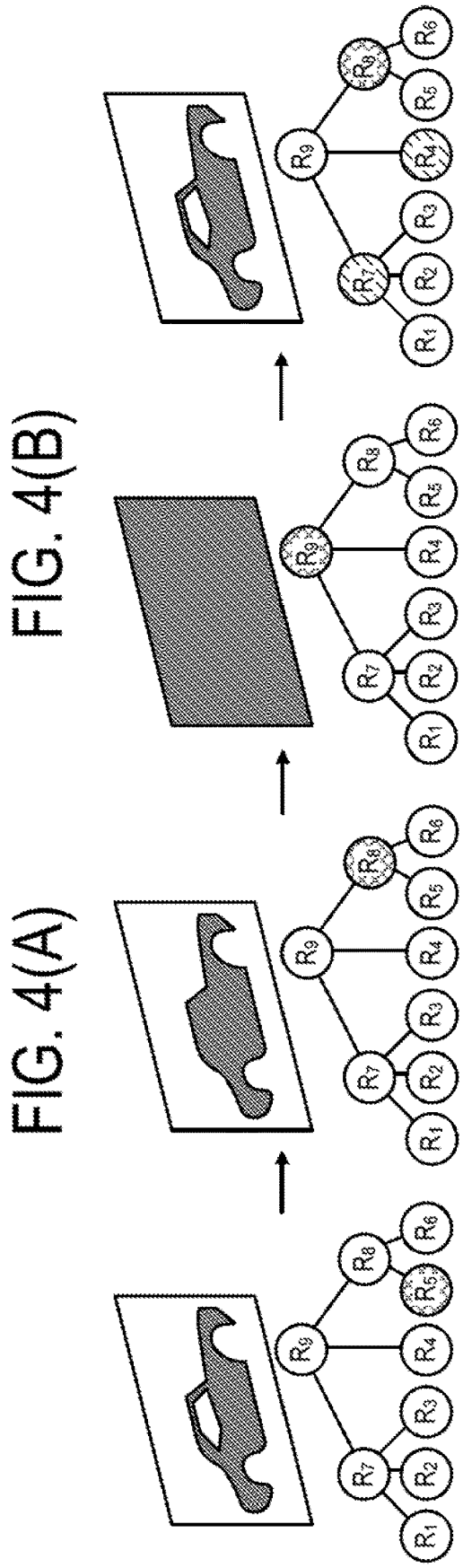
FIG. 4(A) FIG. 4(B) FIG. 4(C) FIG. 4(D) FIG. 4(E) FIG. 4(F)

VIDEO OBJECT TAGGING USING SEGMENTATION HIERARCHY

BACKGROUND

Image and video segmentation is one of the most fundamental yet challenging problems in computer vision. Dividing an image into meaningful regions requires a high level interpretation of the image that cannot be satisfactorily solved by only looking for homogeneous areas in an image. In the era of big data and vast computing power, one approach to model high level interpretation of images has been to use powerful machine-learning tools on huge annotated databases. While significant advances have been made in recent years, automatic image segmentation is still far from providing accurate results in a generic scenario. The creator of a video may desire to add information or a link to an object in a video, and may wish the added information or link to remain associated with that object throughout a video sequence.

SUMMARY

The present disclosure is directed to tagging objects in a video, substantially as shown in and/or described in connection with at least one of the figures, as set forth more completely in the claims.

BRIEF DESCRIPTION OF THE DRAWINGS

FIGS. 4(a)-(f) show exemplary diagrams for selecting objects using a segmentation hierarchy, according to one implementation of the present disclosure;

DETAILED DESCRIPTION

Figure 1:
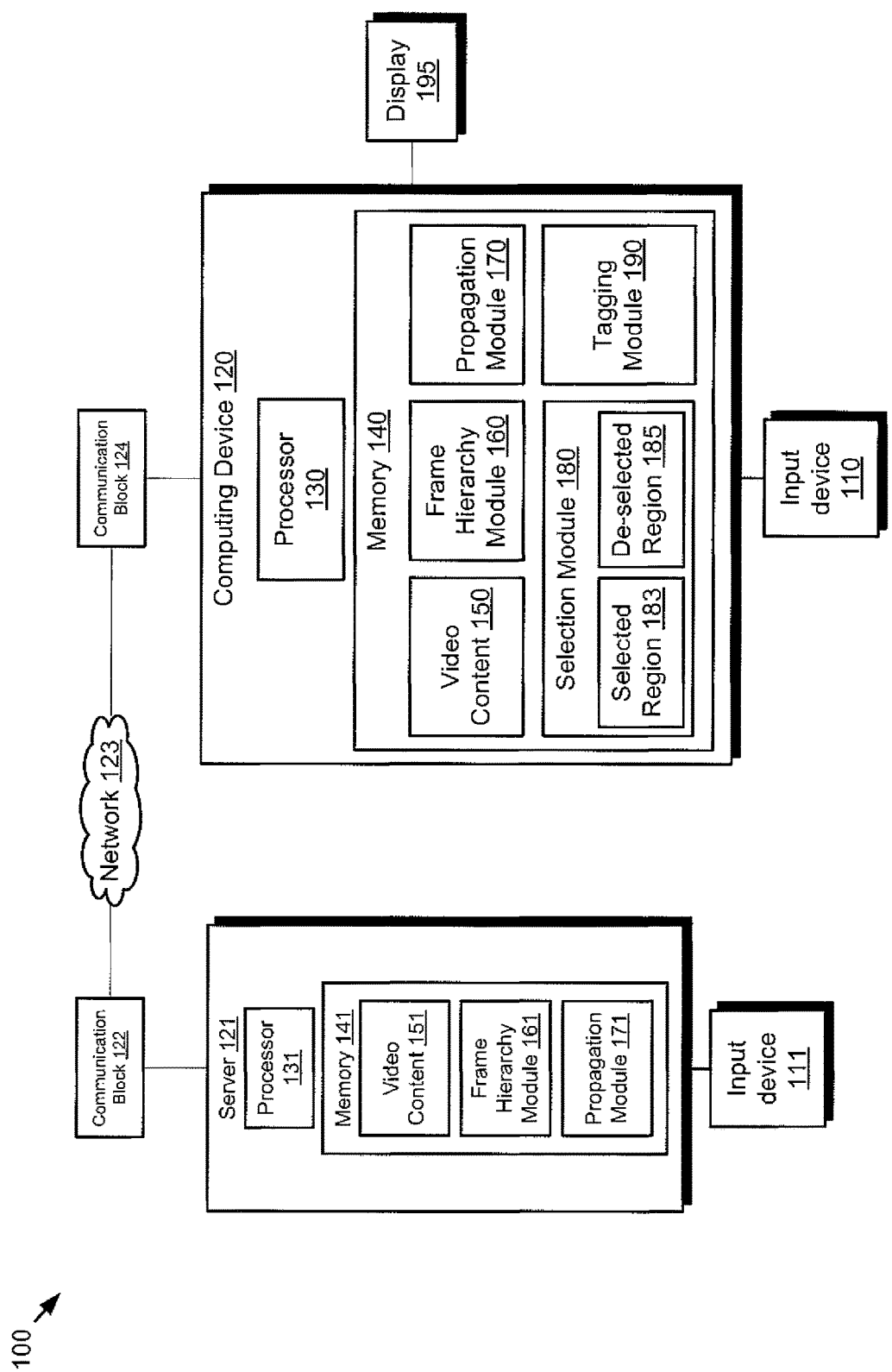
FIG. 1 shows a diagram of an exemplary system for tagging objects in a video, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for tagging objects in a video, according to one implementation of the present disclosure. As shown in FIG. 1, object tagging system 100 includes computing device 120, display 195, and input device 110, and may include input device 111, server 121, communication block 122, network 123, and communication block 124.

Input device 110 may be a tool for a user to provide input into computing device 120 or any device suitable for providing user input to a video editing system, such as a computer mouse, a computer keyboard, a touch-sense embedded in display 195.

Computing device 120 also includes processor 130 and memory 140. Processor 130 may be a hardware processor or a central processing unit (CPU) configured to receive input from input device 110, access memory 140, and display video frames on display 195. Memory 140 is a non-transitory medium for storing data. Memory 140 may store video content 150, frame hierarchy module 160, propagation module 170, selection module 180, and tagging module 190.

Video content 150 may include a plurality of frames and may be stored in any video format. In some implementations, video content 150 may be MPEG, MPEG-1, MPEG-2, .mov, .3gp, .flv, .gif, M4V, WMV, AVCHD, or any other formats appropriate for storing video files. Each frame of video content 150 may include a plurality of elements that make up the frame. For example, in case of a movie, a frame of video content 150 may include one or more actors, a building, a car, and other scene elements, such as trees and bridges. Each of these elements may include further items, such as items of an actor's clothing, the railing on a bridge, the leaves and trunk of a tree, and the windows and walls of a building.

Frame hierarchy module 160 may include a program configured to segment each frame of video content 150 into a plurality of regions. Segmentation hierarchies may be based on contour detectors, whose output is the probability of each pixel boundary segment being a contour. Thresholding this probability, frame hierarchy module 160 may produce a binary contour map, which classifies pixel boundaries into contour/no-contour. The contour probability map may then be transformed into a contour saliency map, or ultrametric contour map (UCM), such that, for any threshold t, the output binary contour map may produce closed boundaries. Thus, the output of 160 may be a segmentation of the image whose contours are the ones obtained by the UCM. As such, each piece of contour in the UCM can be seen as the boundary between two (or more) regions in the image, and thus augmenting the contour strength threshold can be interpreted as merging the neighboring regions. Frame hierarchy module 160 may represent regions as nodes of a graph, and the merged region as the parent of the original regions. Accordingly, the UCM may be used to create a segmentation hierarchy.

Propagation module 170 may include a program configured to propagate a selected region of a frame of video content 150 to one or more other frames of video content 150. To propagate a selected region, propagation module 170 may calculate an optical flow, which links the pixels from one frame to the position where they have moved in the following frame. Using this information, propagation module 170 may propagate the selected region to one or more frames of the plurality of frames, which may provide an estimate of the mask of the objects in the one or more frames of the plurality of frames. The mask may be refined in subsequent frames by adapting the selected region to the segmentation hierarchies computed on the subsequent frames.

Selection module 180 may include a program configured to select one or more regions of a frame of video content 150. Selection module 180 may be configured to select, in response to input received from input device 110, a region of a frame of video content 150. The input from the user may include a mouse click to select an element of the displayed frame of video content 150. Alternatively, input from the user may include a touch on a touch-screen of display 195 to select an element of the displayed frame of video content 150. Selection module 180 may be configured to select a region of video content 150, and then to modify or alter that selection by selecting additional regions of the frame. Additionally, selection module may be configured to deselect a region if the user does not want that region to be part of the selected region. Selected region 183 may include a region selected by a first input from the user. Selected region 183 may also include additional regions selected by a second input from the user, and any subsequently selected regions that are not deselected by the user. Deselected region 185 may include regions that are selected and then deselected by the user.

Tagging module 190 may be used to tag a selected region. In some implementations, a selected region may be tagged with information such as metadata tags. Metadata tags may include information about the selected region. For example, a metadata tag may describe the location of a selected region within a frame of video content 150. A metadata tag may include information about the element corresponding to a selected region. For example, a selected region may correspond to a character in a movie and may be tagged with metadata including background information about that character, information about the actor portraying the character, or other information. In some implementations, the information included in a tag may be viewed by a consumer of tagged video content by, for instance, mousing over the character to view the information. In some implementations, a selected region may be tagged with other information, such as a list of points that define the selected region. In some implementations, tagged information may include a website or a link to a website.

Display 195 may be a television, a computer monitor, a display of a tablet computer, or a display of a mobile phone. In some implementations, display 195 may be configured to receive input from a user using a touch. Display 195 may be a light emitting diode (LED) display, an organic light emitting diode (OLED) display, a liquid crystal display (LCD), a plasma display, a cathode ray tube (CRT), an electroluminescent display (ELD), or other display appropriate for viewing video content 150.

In some implementations, a first networked computer may perform segmentation of video frames and propagation of selected regions, while a second networked computer may perform selection and tagging. Server 121 includes processor 131 and memory 141, and may include input device 111. Memory 141 may include video content 151, frame hierarchy module 161, and propagation module 171. Computing device 120 and server 121 may be connected to network 123. In some implementations, object tagging system 100 may include computing device 120 and server 121, where the tagging operation is divided into a backend, performed by server 120, and a frontend, performed by computing device 120, and communicated via network 123. In some implementations, object tagging system 100 includes communication block 122 in the backend, and communication block 124 in the frontend to minimize the bandwidth required by network 123, thus maximizing responsivity in the frontend. In some implementations, frame hierarchy module 160 and/or frame hierarchy module 161 is modified to create hierarchies that do not contain holes, i.e., each segmentation contour has only an outer boundary and does not surround an area of frame that is not included in the segmentation, allowing the selection process converge faster to the desired target region.

Figure 2:
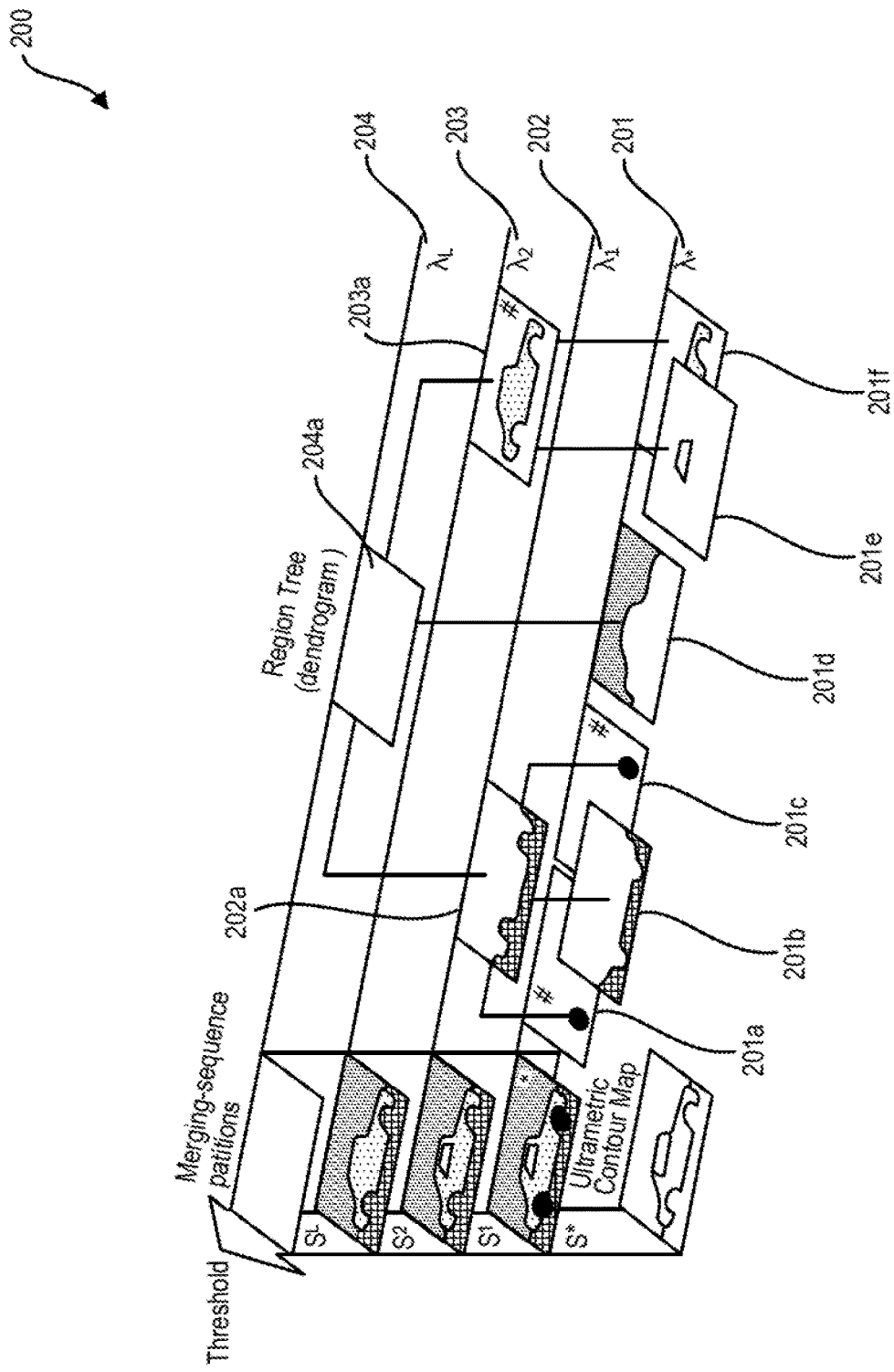
FIG. 2 shows a diagram of a segmentation hierarchy for tagging objects in a video, according to one implementation of the present disclosure.

FIG. 2 shows a diagram of a segmentation hierarchy for tagging objects in a video, according to one implementation of the present disclosure. Segmentation hierarchy diagram 200 shows an exemplary frame from video content 150. Frame hierarchy module 160 may segment the frame into regions where each region corresponds to an element of the frame. An element may include an object in the frame, a portion of an object in the frame, an area of the frame including more than one object. Frame hierarchy module 160 begins with a frame of the plurality of frames in video content 150 and applies a contour detector that outputs a probability of each pixel in the frame being a contour. Thresholding the probability output produces a binary contour map, which classifies pixel boundaries. Frame hierarchy module then transforms the contour probability into a contour saliency map, or UCM. For every threshold t, the output binary contour map produces closed boundaries, and each area bounded by such a boundary may be defined as a region.

Each piece of contour in the UCM may be considered a boundary between regions of the frame. Accordingly, adjusting the contour strength threshold t may cause neighboring regions of the frame to merge. Regions of a frame may be represented as nodes of a graph, and the merged regions may be represented as parent regions. In this manner, a UCM may be represented as a dendogram, as shown in FIG. 2. The frame displayed in FIG. 2 includes the ground, the sky, and a car with two wheels, a window, and a body. At level 201, the most granular level of segmentation is shown. Segments 201*a* and 201*c* represent regions corresponding to the wheels, and segment 201*b* represents the region corresponding to the ground. Segment 201*d* represents the region corresponding to the sky, and regions 201*e* and 201*f* represent the regions corresponding to the window and the body of the car, respectively. Level 202 corresponds to a parent level of the dendogram, where region 202*a* represents the parent region corresponding to the merging of regions 201*a*, 201*b*, and 201*c*. Level 203 corresponds to a parent level of the dendogram, where region 203*a* represents the parent region corresponding to the merging of regions 201*e* and 201*f*. Level 204 corresponds to a parent level of the dendogram including all of the regions 201*a*-201*f*, which is also the frame.

Figure 3:
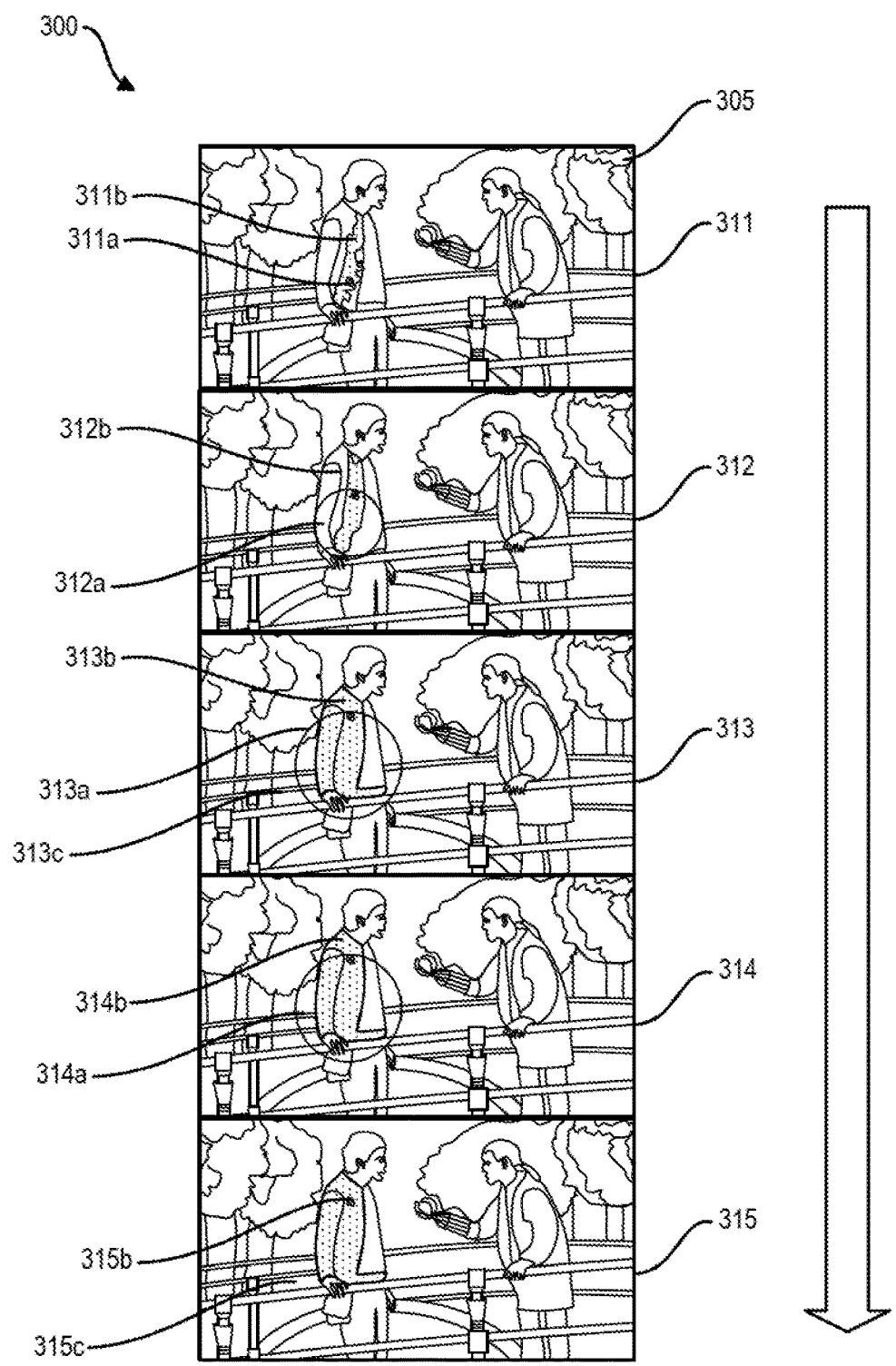
FIG. 3 shows an exemplary diagram of a selection of a region in a video frame for tagging objects, according to one implementation of the present disclosure.

FIG. 3 shows an exemplary diagram of a selection of a region in a video frame for tagging objects, according to one implementation of the present disclosure. Region selection diagram 300 shows a sequence depicting selection of an element of frame 305 and, specifically, clothing being worn by the person on the left in frame 305. Image 311 shows that a user may provide a first input by clicking a mouse on the jacket worn by the person on the left, as shown by user selection 311*a*. Region 311*b* may be a first region that is selected based on the input from user selection 311*a*, and may correspond to the most granular level of the segmentation hierarchy of frame 305. Image 312 shows that region 312*b* may correspond to a second input from the user. The second input may include dragging the initial selection to increase the selection to that shown by selection 312*a*. Region 312*b* may include the first region and the second region corresponding to the user's second input of dragging the mouse.

Image 313 shows that the user may have continued to provide input by dragging the mouse, resulting in a larger selection 313*a*. 313*b* may indicate more of the clothing has been selected, and 313c may indicate the selection of a region that is not clothing being worn by the person on the left in frame 305. The user may have intended to only select the clothing, making 313b a desirable region to have selected, and 313c an undesirable region to have selected. Accordingly, image 314 shows that the user may have reduced the size of the selected area to that of 314a by dragging the mouse back. Region 314b may be the selected region and may correspond to the desired region. Image 315 shows that region 315b, which corresponds to the clothing being worn by the person on the left, remains selected. Region 315c, corresponding to the undesirable region selected at 313, may be a deselected region of frame 305. In some implementations, the selected region 315b may be stored in memory 140 and correspond to selected region 183. In some implementations deselected region 315c may be stored in memory 140 and correspond to deselected region 185 for use to avoid re-selecting deselected region 185.

FIGS. 4(a)-(f) show exemplary diagrams for selecting objects using a segmentation hierarchy, according to one implementation of the present disclosure. FIG. 4(a) shows video frame 405 including sky $R_4$, ground $R_1$, and a car having two wheels, back wheel $R_2$ and front wheel $R_3$, body $R_5$, and window $R_6$. Segmentation hierarchy 406 depicts regions $R_1$ through $R_6$ as the most granular level of segmentation. Parent regions $R_7$ and $R_8$ correspond to parent nodes of regions $R_1$-$R_3$ and regions $R_5$-$R_6$, respectively. FIG. 4(b) shows regions $R_2$, $R_3$, and $R_8$ of frame 405 that correspond to the car. FIG. 4(c) shows that region $R_5$ is selected, which is shown as the body of the car and corresponding node of segmentation hierarchy 406 being highlighted. FIG. 4(d) shows that the selection has increased to include section $R_6$. Accordingly, the node corresponding to the parent region $R_8$ is highlighted in segmentation hierarchy 406. FIG. 4(e) shows that the selected region has increased to include all elements of frame 405. Accordingly, the node corresponding to parent node $R_9$ is highlighted in segmentation hierarchy 406. FIG. 4(f) shows that the selection has been reduced to include only parent region $R_8$. To reduce the selection back to parent region $R_8$, parent region $R_7$ and region $R_4$ were deselected. The de-selection of these regions is depicted at 4(f) by the cross-hatching of parent node $R_7$ and node $R_4$ in segmentation hierarchy 406.

Figure 5:
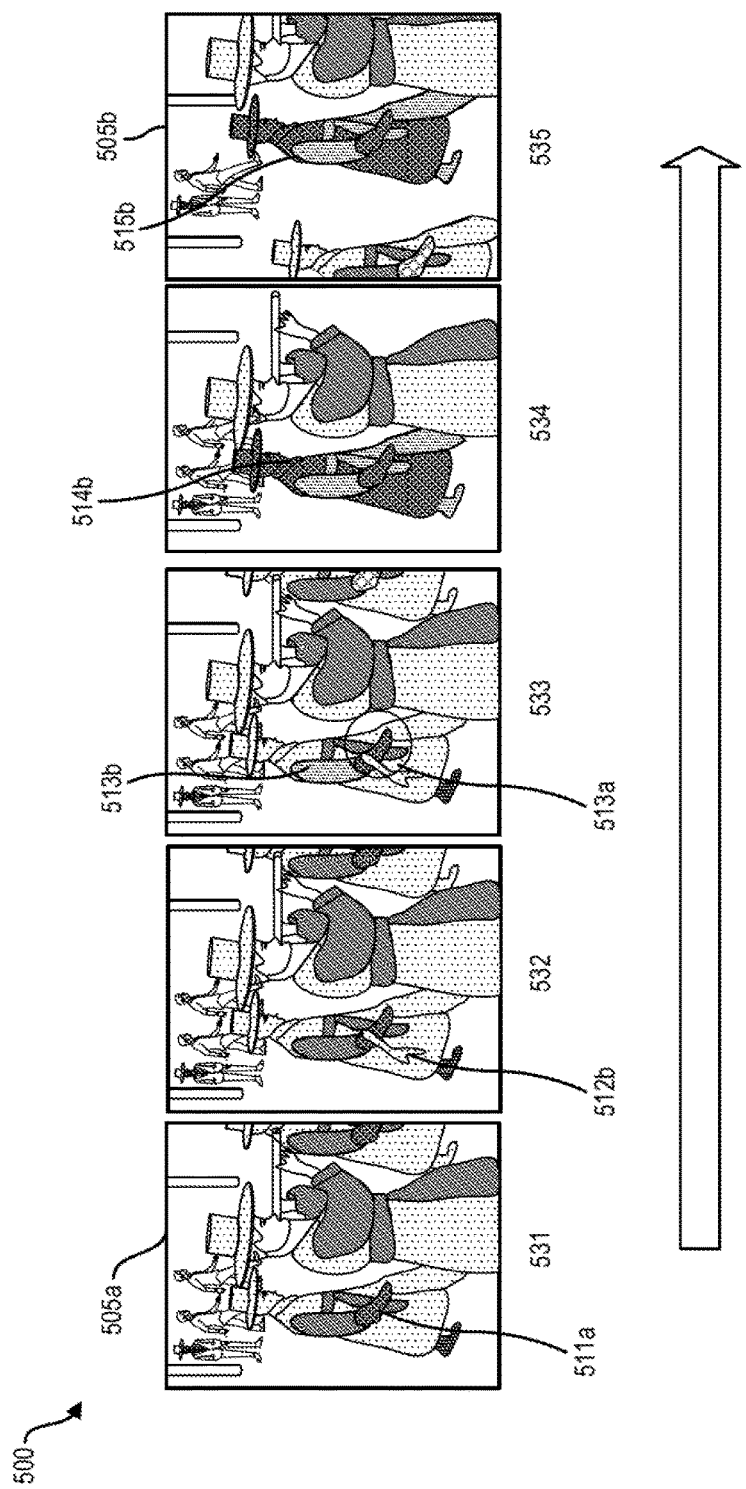
FIG. 5 shows an exemplary sequence of propagating a selected region through sequential frames of a video, according to one implementation of the present disclosure.

FIG. 5 shows an exemplary sequence of propagating a selected region through sequential frames of a video, according to an implementation of the present disclosure. Images 531 through 534 show a selection process for selecting a desired region of frame 505a. Image 531 shows that the user provides input as a mouse click making selection region 511a. Next, image 532 shows that the user drags the mouse to make the selection grow, and thus creating selection region 512b. Image 533 shows that the user releases the mouse when selection 513a cannot increase selection region 513b more inside the object. Image 534 shows that the process is reiterated until desired region 514b is marked. Image 535 shows that selected region 515b is propagated to selection region 515b in frame 505b.

Figure 6:
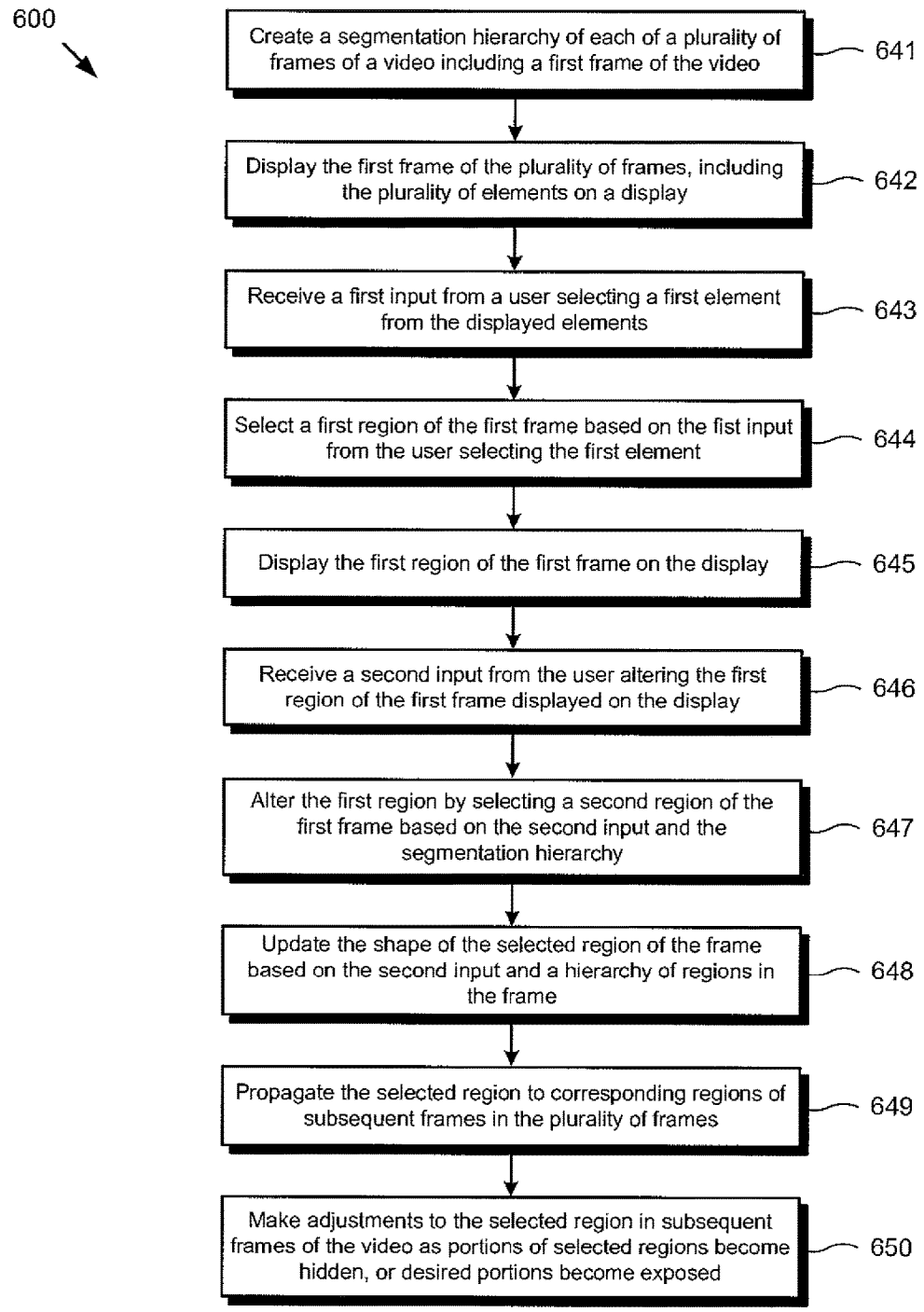
FIG. 6 shows a flowchart illustrating an exemplary method of tagging an object in a video, according to one implementation of the present disclosure.

FIG. 6 shows a flowchart illustrating a method of tagging an object in a video, according to one implementation of the present disclosure. At 641, object tagging system 100, using processor 130, utilizes frame hierarchy module 160 to create a segmentation hierarchy of each of a plurality of frames of video content 150 including a segmentation hierarchy of a first frame of video content 150. To create the segmentation hierarchy, frame hierarchy module 160 determines the probability that each pixel in the frame is a boundary pixel. The resulting contour probability map is transformed into a UCM by frame hierarchy module 160, where, for any threshold t, the binary contour map produces closed boundaries, by classifying pixels boundaries into contour and no-contour, that is, pixel boundaries whose probability is higher or lower, respectively, than t. Frame hierarchy module 160 segments the frame according to the contours obtained by the UCM. By applying various thresholds t, frame hierarchy module 160 creates the segmentation hierarchy for the frame.

At 642, object tagging system 100, using processor 130, displays the first frame on display 195. Display 195 may be any type of display appropriate for viewing and tagging video frames, such as a desktop computer display, a notebook computer display, a tablet computer display, a smartphone display. Display 195 may be a touch-screen display or a non-touch-screen display.

At 643, computing device 120 receives a first user input from input device 110. The first user input may select a first element from a plurality of elements in the first frame. In some implementations, the first user input may be a mouse click. A mouse click may be a click and release to select a region, or the mouse click may include the user clicking the mouse and holding. In some implementations, the user input may be a touch on a touch screen, and may include a touch and release or the user may touch and maintain that touch. A touch on a touch-screen may include a touch with a finger, a stylus, or another tool appropriate for use with a touch-screen.

At 644, object tagging system 100, using processor 130, utilizes selection module 180 to select a first region of the first frame, based on the first input and the segmentation hierarchy. The first region may include an element of the first frame, which may be a portion of an object in the first frame, an entire object in the first frame, or more than one object in the first frame. In some implementations, the first region selected may be determined by the location of the selection tool at the time of the first input, and the segmentation hierarchy of the first frame. The first region may correspond to the most granular region of the segmentation hierarchy encompassing the selection tool when the user makes the first input.

At 645, object tagging system 100, using processor 130, displays a first region of the first frame on display 195. In some implementations, displaying the first region on display 195 may include highlighting the first region on display 195. Highlighting the first region may include marking the first region with a boundary line, such as a colored line or a dotted line, to indicate on display 195 the first region. In some implementations, highlighting the first region may include masking the region with color, the boundary of the colored region corresponding to the boundary of the first region.

At 646, computing device 120 receives a second user input. In some implementations, the second user input may include dragging the mouse click corresponding to the first user input, or the second input may correspond to dragging the touch on the touch-screen corresponding to the first user input. In some implementations, the second user input may correspond to a second mouse click or a second touch on a touch-screen. The second user input may be used to alter the first region of the first frame.

At 647, object tagging system 100, using processor 130, alters the first region by selecting a second region of the first frame based on the second input and the segmentation hierarchy. In some implementations, altering the first region includes expanding the first region to include more of the first frame. In some implementations, altering the first region includes selecting a second region, which may be the parent region of the first region in the segmentation hierarchy. In some implementations, the second region may be a neighboring region on the same level of the segmentation hierarchy, such as when the first region is the most granular level of the hierarchy and the second region is a neighboring most granular level of the segmentation hierarchy. Once the first region and second region are selected, selection module 180 may combine the first region and the second region into one selected region. Sometimes, during the altering, a region of the frame may be selected, but it is not intended to be part of the selected region, so that unintended region may be deselected. When a region is deselected, it is no longer part of the selected region.

At 648, object tagging system 100, using processor 130, updates the shape of the first region of the first frame based on the second input and the segmentation hierarchy. In some implementations, updating the shape of the first region includes updating the shape to include the entire selected region, as described above. In some implementations, the selected region may be stored in memory 140. In some implementations, the deselected region may be stored in memory 140. Selected and deselected regions may be stored as selected region 183 and deselected region 185, respectively. The user may repeat the process of updating the shape of the selected region until the user is satisfied with the shape of the selected region, and the user has selected all desired regions.

At 649, object tagging system 100, using processor 130, utilizes propagation module 170 to propagate the selected region of the first frame to corresponding regions of one or more subsequent frames of video content 150.

Once the selected region has been selected in the first frame, propagation module 170 may propagate the masks to one or more frames of the plurality of frames in video content 150 to minimize the user interaction. In some implementations, propagation module 170 may pre-compute the optical flow, which may link pixels from the first frame to the position where they may have moved in the one or more frames of the plurality of frames. Using this information, propagation module 170 may propagate the marked pixels to the one or more other frames, which may provide an estimate of the mask of the objects in the one or more other frames.

At 650, object tagging system 100, using processor 130, the user may make adjustments to the selected region in the one or more subsequent frames of video content 150 by adapting the selected region to the segmentation hierarchies computed on the plurality of frames. In some implementations, elements of a frame of the plurality of frames of video content 150 may become hidden or exposed as video content 150 progresses. An element may enter the frame, an element may exit the frame, an element may pass in front of another element, or an element may pass behind another element. During the movement of an element, portions of the element may become hidden or exposed from frame to frame. In some implementations, propagation of the selected region may not account for newly exposed or hidden portions in subsequent frames of video content 150. In some implementations, processor 130 may be used to display a subsequent frame on display 195. To adjust the selected region in the subsequent frame, a user may provide a third input to select a third region in the subsequent frame. As above, after the user has selected a new region, the newly selected region may be included in the selected region. In some implementations, the selected region may be altered to include the third region, based on the third input and the segmentation hierarchy.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
   a memory storing a segmentation hierarchy of each of a plurality of frames of a video, wherein the segmentation hierarchy is a segmentation of the plurality of frames of the video into a plurality of regions, each of the plurality of regions corresponding to an element of each of the plurality of frames, the plurality of frames including a first frame having a first plurality of regions corresponding to a first plurality of elements;
   a display; and
   a processor configured to:
      display the first frame including the first plurality of elements on the display;
      receive a first input from a user selecting a first element of the first plurality of elements displayed on the display;
      select a first region of the first plurality of regions of the first frame based on the first input from the user selecting the first element;
      display the first region of the first frame on the display;
      receive a second input from the user altering the first region of the first frame displayed on the display;
      alter the first region by selecting a second region of the first plurality of regions of the first frame based on the second input from the user and the segmentation hierarchy, wherein the second region comprises one or more masks; and
      propagate the one or more masks to a corresponding region of one or more other frames of the plurality of frames by:
         computing an optical flow linking pixels from the first frame to estimated positions to which the pixels have moved in the one or more other frames; and
         refining the one or more masks in the one or more other frames by adapting the selected second region according to each corresponding one of the segmentation hierarchies of the one or more other frames.

2. The system of claim 1, wherein the second region encompasses at least a portion of the first region.

3. The system of claim 2, wherein the processor is further configured to:
   display the second region of the first plurality of regions of the first frame on the display;
   receive a third input from the user altering the second region of the first plurality of regions of the first frame displayed on the display;

select a third region of the first plurality of regions of the first frame based on the third input from the user altering the second region, wherein the processor prevents the portion from being included in the third region.

4. The system of claim 1, wherein the first input is a mouse click, and the second input is a mouse drag.

5. The system of claim 1, wherein the first input includes a touch on a touch-screen, and the second input includes dragging the touch on the touch-screen.

6. The system of claim 1, wherein the processor is further configured to associate a selected region of the frame with information corresponding to an element within the selected region of the frame, the selected region including at least the first region and the second region.

7. The system of claim 1, wherein the first region and the second region have only an outer boundary and no holes.

8. A method for use by a system having a display, a processor and a memory storing a segmentation hierarchy of each of a plurality of frames of a video, the segmentation hierarchy being a segmentation of the plurality of frames of the video into a plurality of regions, each of the plurality of regions corresponding to an element of each of the plurality of frames, the plurality of frames including a first frame having a first plurality of regions corresponding to a first plurality of elements, the method comprising:
displaying, using the processor, the first frame including the first plurality of elements on the display;
receiving, using the processor, a first input from a user selecting a first element of the first plurality of elements displayed on the display;
selecting, using the processor, a first region of the first plurality of regions of the frame based on the first input from the user selecting the first element;
displaying, using the processor, the first region of the first frame on the display;
receiving, using the processor, a second input from the user altering the first region of the first frame displayed on the display;
altering, using the processor, the first region by selecting a second region of the first plurality of regions of the first frame based on the second input from the user and the segmentation hierarchy, wherein the second region comprises one or more masks; and
propagating, using the processor, the one or more masks to a corresponding region of one or more other frames of the plurality of frames by:
computing an optical flow linking pixels from the first frame to estimated positions to which the pixels have moved in the one or more other frames; and
refining the one or more masks in the one or more other frames by adapting the selected second region according to each corresponding one of the segmentation hierarchies of the one or more other frames.

9. The method of claim 8, wherein the second region encompasses at least a portion of the first region.

10. The method of claim 8 further comprising:
displaying the second region of the first plurality of regions of the first frame on the display;
receiving a third input from the user altering the second region of the first plurality of regions of the first frame displayed on the display; and
selecting a third region of the first plurality of regions of the first frame based on the third input from the user altering the second region, wherein the processor prevents the portion from being included in the third region.

11. The method of claim 8, wherein the first input is a mouse click, and the second input is a mouse drag.

12. The method of claim 8, wherein the first input includes a touch on a touch-screen, and the second input includes dragging the touch on the touch-screen.

13. The method of claim 8 further comprises associating a selected region of the frame with information corresponding to an element within the selected region of the frame, the selected region including at least the first region and the second region.

14. The method of claim 8, wherein the first region and the second region have only an outer boundary and no holes.

* * * * *